United States Patent
He et al.

(10) Patent No.: US 8,244,735 B2
(45) Date of Patent: Aug. 14, 2012

(54) EFFICIENT AND SCALABLE DATA EVOLUTION WITH COLUMN ORIENTED DATABASES

(75) Inventors: Bin He, San Jose, CA (US); Hui-I Hsiao, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 166 days.

(21) Appl. No.: 12/772,697

(22) Filed: May 3, 2010

(65) Prior Publication Data

US 2011/0270844 A1   Nov. 3, 2011

(51) Int. Cl.
    *G06F 17/30* (2006.01)
(52) U.S. Cl. ........................................ 707/745
(58) Field of Classification Search .................. None
    See application file for complete search history.

(56) References Cited

U.S. PATENT DOCUMENTS

| | | | |
|---|---|---|---|
| 6,360,213 B1 * | 3/2002 | Wagstaff et al. .................. 1/1 |
| 6,502,102 B1 * | 12/2002 | Haswell et al. .................. 1/1 |
| 6,643,652 B2 * | 11/2003 | Helgeson et al. ................ 1/1 |
| 6,721,747 B2 * | 4/2004 | Lipkin .......................... 709/209 |
| 6,785,689 B1 | 8/2004 | Daniel et al. |
| 6,850,209 B2 * | 2/2005 | Mankins et al. .............. 345/1.3 |
| 7,072,934 B2 * | 7/2006 | Helgeson et al. ............. 709/203 |
| 7,089,583 B2 * | 8/2006 | Mehra et al. .................... 726/3 |
| 7,171,427 B2 * | 1/2007 | Witkowski et al. .................. 1/1 |
| 7,181,731 B2 * | 2/2007 | Pace et al. .................... 717/136 |
| 7,290,003 B1 | 10/2007 | Tong |
| 7,310,650 B1 | 12/2007 | Felsted et al. |
| 7,685,183 B2 * | 3/2010 | Pace et al. .................... 707/610 |
| 7,685,577 B2 * | 3/2010 | Pace et al. .................... 717/136 |
| 7,752,214 B2 * | 7/2010 | Pizzorni et al. ............... 707/756 |
| 2002/0049603 A1 * | 4/2002 | Mehra et al. ..................... 705/1 |
| 2002/0049749 A1 * | 4/2002 | Helgeson et al. ................ 707/3 |
| 2002/0065046 A1 * | 5/2002 | Mankins et al. ............... 455/59 |
| 2002/0073236 A1 * | 6/2002 | Helgeson et al. ............. 709/246 |
| 2002/0084891 A1 * | 7/2002 | Mankins et al. ........... 340/425.5 |
| 2002/0111146 A1 * | 8/2002 | Fridman et al. ................ 455/99 |
| 2002/0112026 A1 * | 8/2002 | Fridman et al. .............. 709/217 |

(Continued)

FOREIGN PATENT DOCUMENTS

WO    WO 2004023322    3/2004

OTHER PUBLICATIONS

Maneewongvatana, Songrit, "Bitmap Index Partition Techniques for Continuous and High Cardinality Discrete Attributes," 2003, Department of Computer Engineering—King's Mongkut's University of Technology, Thonburi, Thailand, pp. 1-9.*

(Continued)

*Primary Examiner* — Farhan Syed
(74) *Attorney, Agent, or Firm* — Shimokaji & Assoc., PC

(57) ABSTRACT

A method, system and program product for data evolution on column oriented databases is disclosed. For an input evolution operation, reusable and non-reusable attributes are identified. For attributes in a target schema that cannot be reused from the source schema, data and bitmap indexes of those attributes are generated from source data and bitmap indexes. A decompose operation is disclosed for decomposing a table into two tables. A merge operation is disclosed in which only one input table can be reused for mergence. A second merge operation is disclosed in which both input tables cannot be reused for mergence.

20 Claims, 15 Drawing Sheets

U.S. PATENT DOCUMENTS

| | | | |
|---|---|---|---|
| 2003/0051236 A1* | 3/2003 | Pace et al. | 717/177 |
| 2003/0140308 A1 | 7/2003 | Murthy et al. | |
| 2004/0034616 A1* | 2/2004 | Witkowski et al. | 707/1 |
| 2005/0050056 A1 | 3/2005 | Idicula et al. | |
| 2008/0071812 A1 | 3/2008 | Baby et al. | |
| 2008/0082560 A1 | 4/2008 | Agrawal et al. | |
| 2008/0270363 A1* | 10/2008 | Hunt et al. | 707/3 |
| 2008/0288889 A1* | 11/2008 | Hunt et al. | 715/810 |
| 2008/0320012 A1 | 12/2008 | Loving et al. | |
| 2009/0254572 A1* | 10/2009 | Redlich et al. | 707/10 |

OTHER PUBLICATIONS

Canahuate, Guadalupe, "Enhanced Bitmap Indexes for Large Scale Data Management," Doctoral Dissertation, The Ohio State University, 2009, pp. 1-220.*

Madduri, Kamesh, et al., "Efficient Join with Compressed Bitmap Indexes," Nov. 2-6, 2009, CIKM '09, pp. 1017-1026.*

Chen, Changqing, "Indexing of Multidimensional Discrete Data Spaces and Hybrid Extensions," Department of Science, Michigan State University, 2009, pp. 1-185.*

Maneewongvatana, Songrit, "Bitmap Index Partition Techniques for Continuous and High Cardinality Discrete Attributes," Department of Computer Engineering, King's Mongkut's University of Technology, Thailand, 2003, pp. 1-9.*

Abadi, Daniel, "Column-Stores vs. Row-Stores: How Different Are They Really?," Jun. 9-12, 2008, ACM SIGMOD '08, Vancouver, British Columbia, pp. 1-14.*

Wu. Ming-Chuan, "Encoded Bitmap Indexes and Their Use for Data Warehouse Optimization," Jan. 12, 2001, Fachbereich Information Technology University, Darmstady, Germany, pp. 1-231.*

Enrico Franconi, Fabio Grandi, and Federica Mandreoli., A Semantic Approach for Schema Evolution and Versioning in Object-Oriented Databases.

John Corwin et al., Dynamic Tables: An Architecture for Managing Evolving, Heterogeneous Biomedical Data in Relational Database Management Systems, Journal of American Medical Informatics Association, Jan.-Feb. 2007; 14(1): 86-93.

Amela Karahasahovic, Dag I.K. Sjoberg; Visualizing Impacts of Database Schema Changes—A Controlled Experiment, 0-7695-0474-4/01, 2001 IEEE.

Roland Eckert et al., Challenge of Design Data Exchange between Heterogeneous Database Schema, Proceedings of the $13_{th}$ Conf. Product Data Technology (PDT Europe 2004), Oct. 18-20th, 2004, Stockholm, pp. 125-132.

Carlo A. Curino, Hyun J. Moon, Carlo Zaniolo, Graceful Database Schema Evolution: the PRISM Workbench, VLDM '08, Aug. 24-30, 2008, Auckland, New Zealand.

Mike Stonebraker et al., C-Store: A Column-oriented DBMS, Proceedings of the $31^{st}$ VLDB Conference, Trondheim, Norway, 2005.

* cited by examiner

Algorithm 1 Decomposing a Table
─────────────────────────────────
DECOMPOSE (R($A_1$, ..., $A_n$), $k, p$)
Output: S($A'_1$, ..., $A'_p$)

1: *keyvalues, keypos* =distinction(R, $A_1$, ..., $A_k$)
2: sort *keypos*
3: if $k = 1$ then
4:     $A'_1$ =output(*keyvalues*)
5: else
6:     for $i = 1$ to $k$ do
7:         $A'_i$ = filtering($A_i$, *keypos*)
8: for $i = k + 1$ to $p$ do
9:     $A'_i$ = filtering($A_i$, *keypos*)

Algorithm 2 Distinction on a Single Attribute A
---
DISTINCTION (Bitmap of Attribute $A$)
Output: *keyvalues, keypos*

1: *keyvalues* = ∅
2: *keypos* = ∅
3: for each distinct value $v$ of $A$ do
4:     *vec* = $v$'s vector in $A$'s bitmap
5:     *elasped* = 0
6:     for i = 1 to *vec.size* do
7:         if *vec*[$i$] is a literal word then
8:             $j$ = position of the first seen 1-value bit in *vec*[$i$]
9:             *keypos* = *keypos* ∪ {*elasped* + $j$}
10:            *keyvalues* = *keyvalues* ∪ {$v$}
11:            break
12:         else if *vec* [$i$] is a 1-fill word then
13:            *keypos* = *keypos* ∪ {*elasped* + 1}
14:            *keyvalues* = *keyvalues* ∪ {$v$}
15:            break
16:         else
17:            $N$ = the number of 0s encoded in *vec*[$i$]
18:            *elasped* += $N$
19: return *keyvalues, keypos*

FIG. 5B

Algorithm 3 Filtering a Bitmap Based on a List of Positions

FILTERING (Bitmap of Attribute $A$, $keypos$)
Output: the filtered $tgt$ Bitmap

1: for each vector $vec$ of $A$'s bitmap do
2:    $vec'$ = an empty vector
3:    $elapsed = 0$
4:    $currpos = 1$
5:    for $i = 1$ to $vec.size$ do
6:      if $vec[i]$ is a literal word then
7:        $elapsed$ += 31
8:        while $currpos \leq keypos.size$ and $keypos[currpos] \leq elapsed$ do
9:          add the ($keypos[currpos] - elapsed$)th bit of $vec[i]$ to $vec'$
10:          encode the new added bits in the vector $vec'$ if necessary using WAH encoding
11:          $currpos$++
12:      else
13:        $elapsed$ += the number of 0s (1s) encoded in $vec[i]$
14:        $endpos$ = use a binary search to find the largest position in $keypos$ satisfying $keypos[endpos] \leq elapsed$
15:        add ($endpos - currpos + 1$) 0s (1s) to the vector $vec'$
16:        encode the new added bits in the vector $vec'$ if necessary using WAH encoding
17:        $currpos = endpos + 1$
18:    add the vector $vec'$ to $tgt$ Bitmap
19: return $tgt$ Bitmap

FIG. 5C

Algorithm 4 Key-Foreign Key Based Mergence

810 → MERGENCE (S($A_1, \ldots, A_k, A_{k+1}, \ldots, A_m$),
T($A_1, \ldots, A_k, A_{m+1}, \ldots, A_n$))
Output: The bitmaps of $A_{k+1}, \ldots, A_m$ in R 1: $R_S$ = number of rows in S
2: $R_T$ = number of rows in T
3: for $i$ = 1 to $R_S$ do
820 → 4:  $v_1, \ldots, v_k$ = the values of key attributes $A_1, \ldots, A_k$ of S in row $i$
5:  $u_1, \ldots, u_{m-k}$ = the values of non-key attributes $A_{k+1}, \ldots, A_m$ of S in row $i$
6:  $vec$ = findvector($v_1, \ldots, v_k$, T)
830 → 7:  for $j$ = 1 to $m - k$ do
8:    if $u_j$ has not seen before in the bitmap of $A_{j+k}$ then
9:      set $vec$ as the bitmap vector of $A_{j+k}$ for value $u_j$
10:   else
11:     $vec'$ = the current vector of $A_{j+k}$ for value $u_j$
12:     $vec$ = $vec'$ OR $vec$
13:     replace the bitmap vector of $A_{j+k}$ for value $u_j$ with $vec$

| Algorithm 5 General Mergence |
|---|

MERGENCE (S($A_1, \ldots, A_k, A_{k+1}, \ldots, A_m$),
T($A_1, \ldots, A_k, A_{m+1}, \ldots, A_n$))
Output: R $A_1, \ldots, A_n$)

1110:
1: *keyocc* = empty hash table
2: for each distinct value $v$ of the join attributes $A_1, \ldots, A_k$ do
3:   $occ_S$ = number of occurrences of $v$ in S
4:   $occ_T$ = number of occurrences of $v$ in T
5:   *keyocc*{$v$,S} = $occ_S$
6:   *keyocc*{$v$,T} = $occ_T$
7: generate bitmaps for join attributes 1120:
8: processTable (S, $k$, *keyocc*, consecutive)
9: processTable (T, $k$, *keyocc*, non-consecutive)

1130:
PROCESSTABLE (X, $k$, *keyocc*, *type*)
1: *keyelasped* = empty hash table
2: *rowelasped* = 0
3: for each distinct value $v$ of join attribute in X do
4:   $occ$ = *keyocc*{$v$,X}
5:   $occ'$ = *keyocc*{$v$,Y}, where Y is the other input table
6:   *vec* = findvector ($v$,X)
7:   *keypos* = the positions of "1" in *vec*
8:   for $i$ = 1 to *keypos.size* do
9:     $u_1, \ldots, u_t$ = the values of non key attributes of X in row *keypos*[$i$]
10:     *pos* = *keyelapsed* {$u_1, \ldots, u_t$}, set to 0 if not exists
11:     for $j$ = 1 to $t$ do
12:       if *type* = *consecutive* then
13:         set $occ'$ bits of the vector of $u_j$ to be 1, from the (*rowelapsed* + $occ'$ * *pos*)th bit to the (*rowelapsed* + $occ'$ * (*pos* + 1) - 1)th bit
14:       else
15:         for $k$ = 0 to $occ'$ - 1 do
16:           set the (*rowelapsed* + $k$ * $occ$ + *pos*)th bit of the vector of $u_j$ to be 1
17:       encode the new added bits in the vector of $u_j$ if necessary using WAH encoding
18:     *keyelapsed*{$u_1, \ldots, u_t$} = *pos* + 1
19:     *rowelapsed* += $occ$ × $occ'$

| Person | Address | Skill |
|---|---|---|
| Jones | 425 Grant Ave | Typing |
| Jones | 747 Industrial Way | Typing |
| Jones | 60 Aubin St | Typing |
| Ellis | 747 Industrial Way | Alchemy |
| Ellis | 501 Oakman Blvd | Alchemy |
| Ellis | 747 Industrial Way | Typing |
| Ellis | 501 Oakman Blvd | Typing |
| Jones | 425 Grant Ave | Shorthand |
| Jones | 747 Industrial Way | Shorthand |
| Jones | 60 Aubin St | Shorthand |

R ← 1230

| Person | Address |
|---|---|
| Jones | 425 Grant Ave |
| Ellis | 747 Industrial Way |
| Jones | 747 Industrial Way |
| Jones | 60 Aubin St |
| Ellis | 501 Oakman Blvd |

S ← 1210, 1240

| Person | Skill |
|---|---|
| Jones | Typing |
| Ellis | Alchemy |
| Ellis | Typing |
| Jones | Shorthand |

EFFICIENT AND SCALABLE DATA EVOLUTION WITH COLUMN ORIENTED DATABASES

BACKGROUND

The present invention relates generally to the field of data evolution, and more specifically, to efficient and scalable data evolution with column oriented databases.

Database evolution is the process of updating the schema of a database or data warehouse (schema evolution) and evolving the data to the updated schema (data evolution). Database evolution is often desired when changes occur to the data or a query workload.

Database evolution has often been a prohibitively expensive process, which may involve the data by performing SQL queries and re-constructing indexes. This prevents the flexible and efficient change of databases.

Hence, there is a need for a more efficient system and method for efficient and scalable data evolution with column oriented databases.

SUMMARY

According to one embodiment of the present invention, a method comprising: decomposing a first table into a second table and a third table, the step of decomposing including: re-using attributes of the first table in the third table; generating data and bitmap indexes for the second table, the step of generating including: locating a first tuple position in the first table for each of a plurality of unique values of a join attribute; forming a filtering vector from a plurality of located positions of the unique values of the join attribute; generating at least one of the data and bitmap indexes for the second table for a first attribute in the second table corresponding to a first attribute in the first table, and performing a target bitmap index generation step, the target bitmap index generation step including: computing a target bitmap index for each unique value of the first attribute in the second table as a corresponding source bitmap index filtered by the filter vector; and generating target data for the first attribute in the second table; and outputting the first table, the second table, and the third table after decomposing the first table into the second table and the third table, in a visual form including at least one of displaying said tables on a display unit or printing said tables on a printer.

In another embodiment of the invention, a system comprising: a computer including a computer processor for processing data evolution; a computer user interface for entering data for a first table and a second table; a data evolution engine for: merging the first table and the second table into a third table; re-using attributes from the first table in the third table; generating data and bitmap indexes for attributes in the third table not reused from the first table, and updating a target bitmap vector, the step of updating the target bitmap vector including: updating the target bitmap vector and a target data of each non-key attribute in a first tuple of a plurality of tuples of the first table, according to a bitmap vector of a key attribute in the first tuple of the first table, and performing the updating of the target bitmap vector for the first tuple of the plurality of tuples in the first table and for at least one of the non-key attributes in the first tuple in the first table; and a computer display for outputting the first, second, and third tables after decomposing the first table into the second table and the third table in a visual form including displaying said tables on a display unit.

In another embodiment of the present invention, a computer program product for data evolution, the computer program product comprising: a computer readable storage medium having computer readable program code embodied therewith, the computer readable program code including: computer program code configured to merge a first table and a second table into a third table, wherein attributes of the first table and attributes of the second table are not reused in the third table; computer program code configured to perform a step to generate data and bitmap indexes for attributes in the third table, the step to generate data and bitmap indexes further including: computer program code configured to compute a number of occurrences of a first unique value of a key attribute in the first table and a first unique value of a key attribute in the second table; computer program code configured to generate a corresponding data and bitmap index for each tuple in the first table and for each non-key attribute of a first tuple in the first table, in which the first unique value of the key attribute in the first table attribute occurs in the first table, for each of a plurality of unique values of the key attribute of the first table; and computer program code configured to generate a corresponding data and bitmap index for each tuple in the second table and for each non-key attribute of a first tuple in the second table, in which the first unique value of the key attribute occurs in the second table, for each of a plurality of unique values of the key attribute of the second table; and computer program code configured to output the first, second, and third tables after decomposing the first table into the second table and the third table in a visual form including on a display unit.

In another embodiment of the present invention, a method for use with a column-oriented database, comprising: transforming first data from a first schema into a second schema, wherein: portions of both the first data and a first index of the first schema are identified that can be re-used in the second schema, and portions of both the first data and the first index of the first schema not included in the re-usable portions of the first data and the first index of the first schema are transformed directly into the second schema.

These and other features, aspects and advantages of the present invention will become better understood with reference to the following drawings, description and claims.

BRIEF DESCRIPTION OF THE SEVERAL VIEWS OF THE DRAWINGS

FIG. 5 is a list of pseudocode of an exemplary embodiment of the invention showing an algorithm for decomposing a table, with its supporting algorithms;

FIG. 8 is a list of pseudocode of an exemplary embodiment of the invention showing an algorithm for key-foreign key based mergence;

FIG. 11 is a list of pseudocode of an exemplary embodiment of the invention showing an algorithm for general mergence;

FIG. 12 is a block diagram of an exemplary embodiment of the invention showing non-reusable general mergence without re-organization.

DETAILED DESCRIPTION

Figure 1:
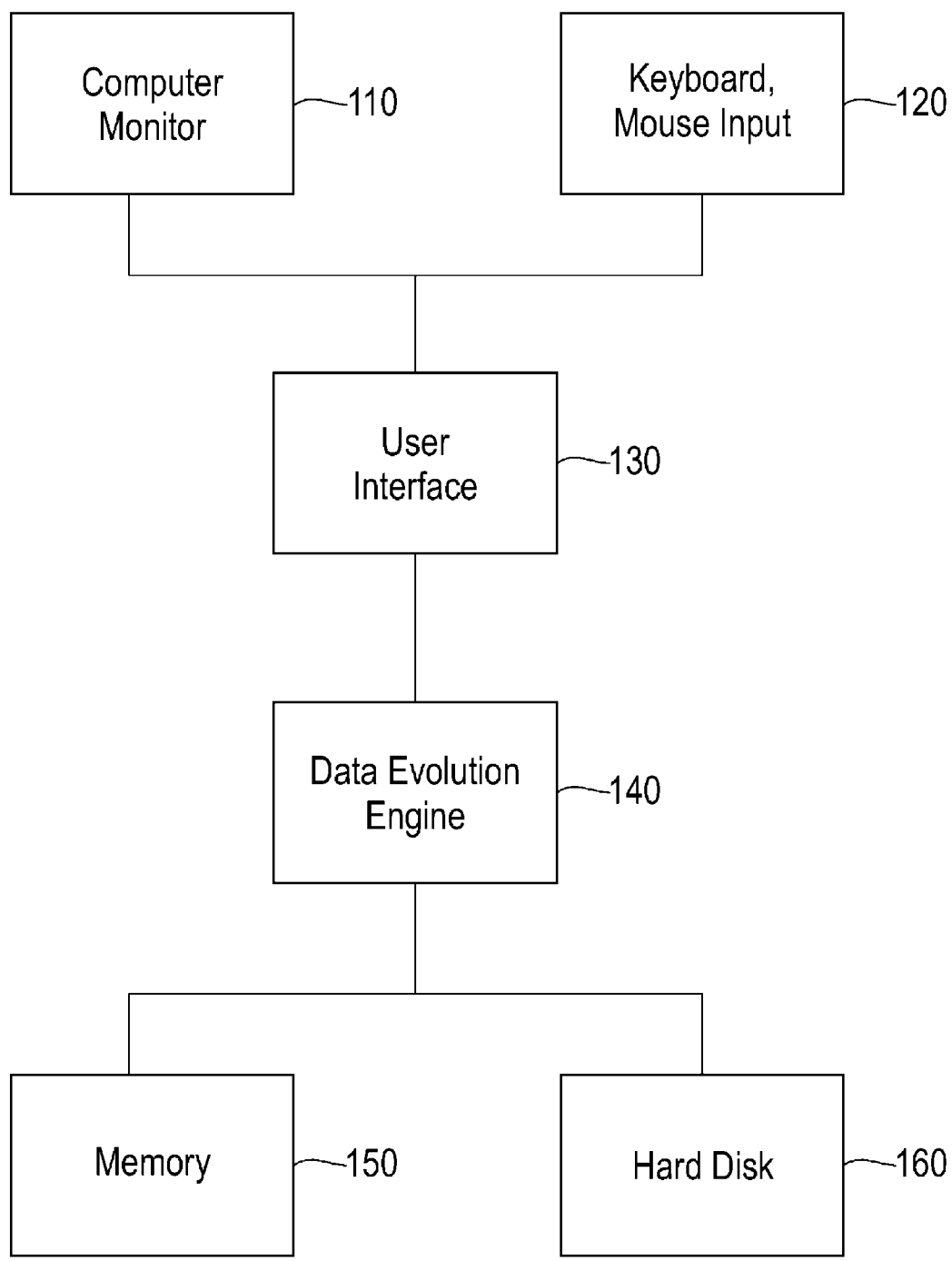
FIG. 1 is a block diagram of a system according to one exemplary embodiment of the invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

The present invention is a method, system and program product for data evolution on column oriented databases. The present invention may be used with commercial database systems.

The present invention presents a method, system, and program product for data evolution on column oriented databases with increased efficiency and speed using proposed algorithms.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer-readable program code embodied thereon.

Any combination of one or more computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain, or store a program for use by or in connection with an instruction performing system, apparatus, or device. A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction performing system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA® (JAVA®is a registered trademark of Sun Microsystems), Smalltalk, C++ or the like and conventional procedural programming languages, such as the "C" programming language or similar programming languages. The program code may perform entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which perform via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which perform on the computer or other programmable apparatus provide processes for implementing the functions/acts specified in the flowchart and/or block diagram block or blocks.

FIG. 1 is a block diagram of a data evolution system 100 according to an exemplary embodiment of the invention. The system 100 may include a computer monitor 110, a keyboard and mouse 120, a user interface 130, data evolution engine 140, memory 150, and a hard disk 160.

The user may utilize the invention by using the user interface 130 displayed on the computer monitor 110 and operating the user interface 130 with the keyboard and mouse 120. The user may utilize the data evolution system 100 by inputting data and functions from the user interface 130 for processing by the data evolution engine 140. The user interface 130 and the data evolution engine 140 may be stored in computer random access memory 150 and on a hard disk 160.

Figure 3:
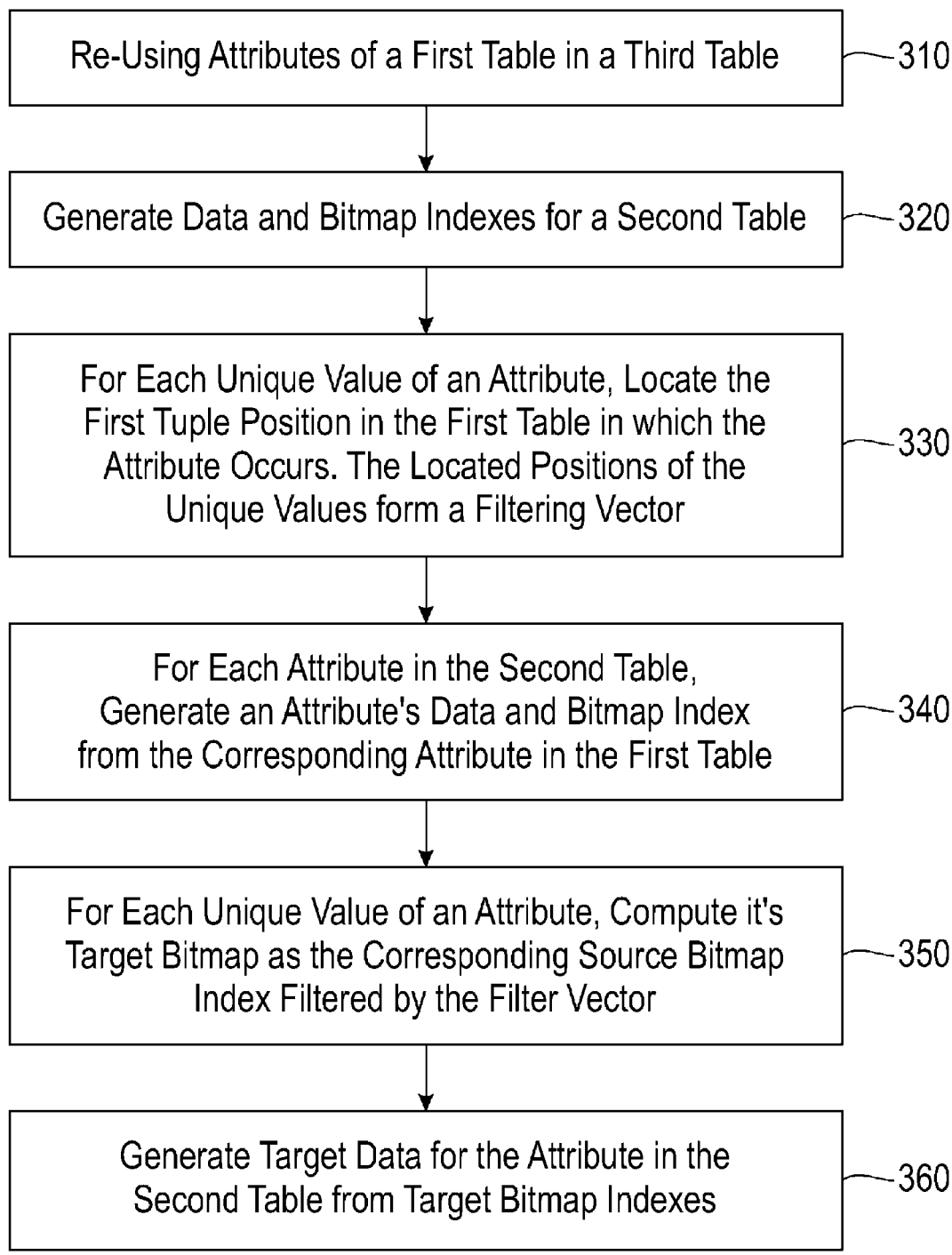
FIG. 3 is an exemplary embodiment of the invention showing high-level steps for decomposing a table.
Figure 4:
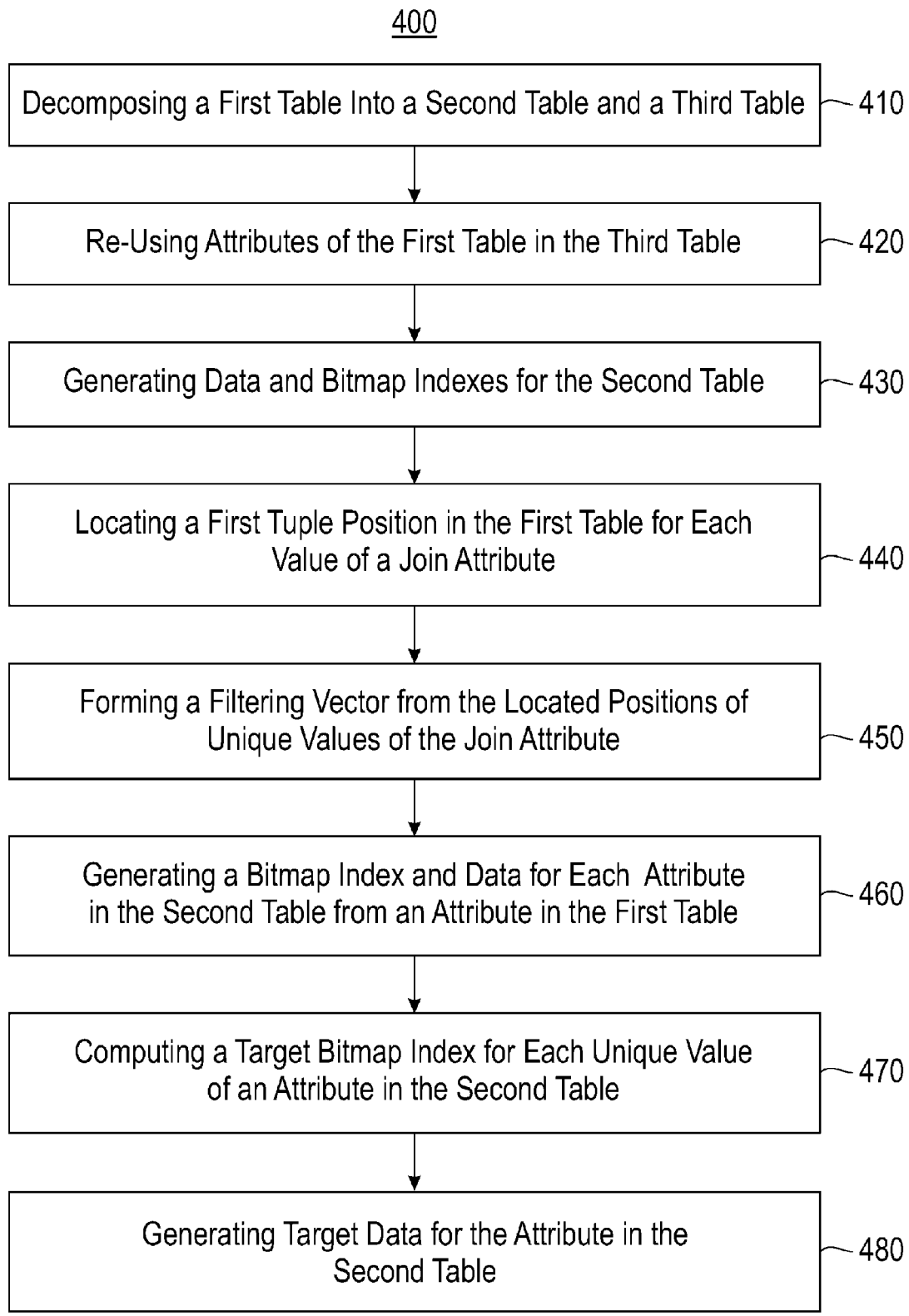
FIG. 4 is a flowchart of an exemplary embodiment of the invention showing decomposition of a table.

The present invention includes the operations of decomposition, examples of which are shown at FIGS. 3-5 and mergence, examples of which are shown at FIGS. 6-13.

Figure 2:
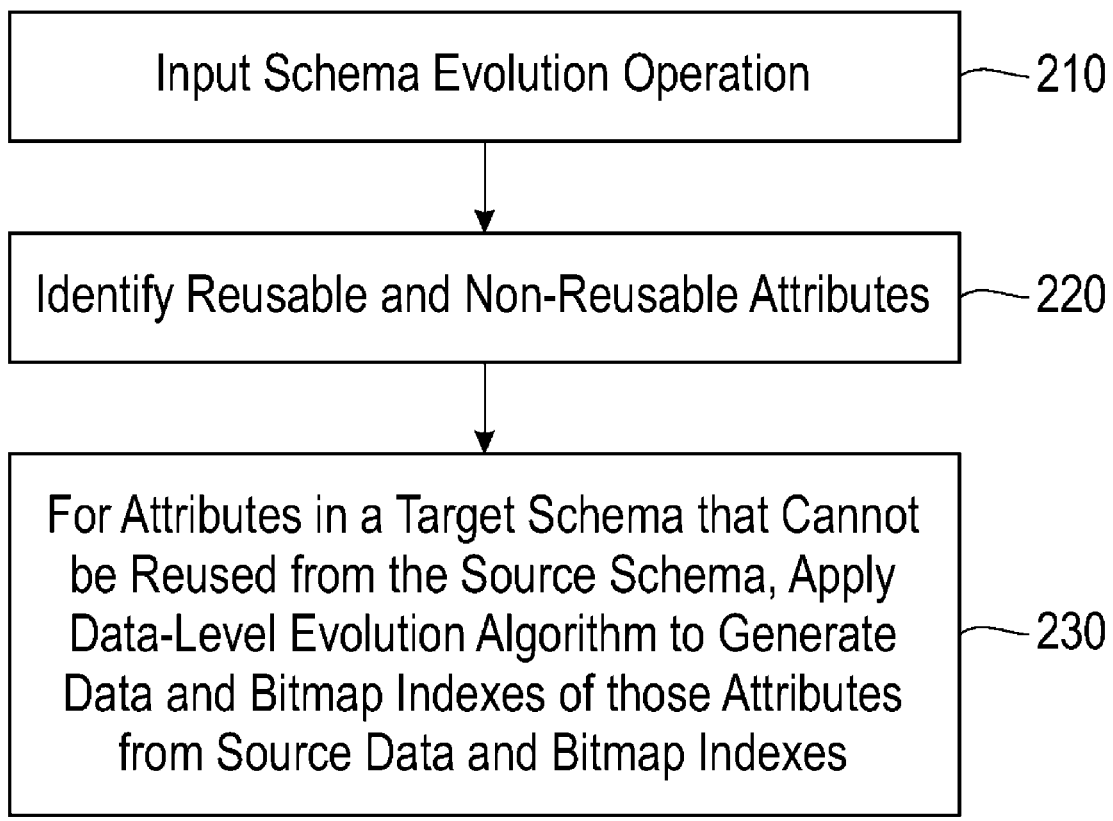
FIG. 2 is an exemplary embodiment of the invention showing high level steps for data-level evolution.

Exemplary processing in the data evolution system 140 of FIG. 1 may be shown in FIG. 2. FIG. 2 is an exemplary embodiment of the invention showing high level steps for data-level evolution 200. A schema evolution operation such as, for example, decomposition as described in FIGS. 3-5 may be input 210. A step 220 may identify reusable and non-reusable attributes of data in a database. As an example, reusable attributes may be utilized to create a resulting table in a data evolution operation. A step 230 may be, for attributes that cannot be reused from the input schema, applying a data-level evolution algorithm to generate data and bitmap indexes of those attributes from source data and bitmap indexes. The following description describes the operations of decomposition and mergence for data-level evolution.

Data-level evolution 200 as described in FIG. 2 may include the operation 300 of decomposition of a table as shown in FIG. 3. FIG. 3 is an exemplary embodiment of the invention showing high-level steps for the decomposition of a table. At block 310, re-using attributes of the first table in the third table may occur when the attribute values do not change from one table to the next table. At block 320, generating data and bitmap indexes for the second table may occur. For example, bitmaps of the second table may be generated directly for attributes in the second table from attributes in the first table. At block 330, for each unique value of an attribute, locating the first tuple position in the first table in which the attribute may occur such that the located positions of the unique values form a filtering vector. As an example, bitmap filtering may not be needed on a resulting table if the resulting table has only one key attribute, and the attributes value only occurs once. At block 340, for each attribute in the second table, an attribute's data and bitmap index are generated from the corresponding attribute in the first table. The block at 340 may call the blocks at block 350 and 360. At block 350, for each unique value of an attribute, computing a target bitmap as a corresponding source bitmap index filtered by the filter vector may occur. At block 360, generating a bitmap index and data for each attribute in the second table from an attribute in the third table may occur.

FIG. 4 shows a flowchart of an exemplary embodiment of the invention showing more detailed steps of decomposition of a table 400 with respect to the high-level steps for decomposition of a table shown in FIG. 3. At block 410, a step of decomposing a first table into a second table and a third table may occur. In an exemplary example of the present invention at least one of the second or third tables may be unchanged from the first table. At block 420 and corresponding to 310 of FIG. 3, re-using attributes of the first table in the third table may occur when the attribute values do not change from one table to the next table. In an exemplary example of the present invention, if the third table has not changed from the first table, the attributes of the third table re-use the attributes in the first table. At block 430, and corresponding to block 320 in FIG. 3, generating data and bitmap indexes for the second table may occur. For example, bitmaps of the second table may be generated directly for attributes in the second table from attributes in the first table. At block 440, and corresponding to block 330 in FIG. 3, locating a first tuple position in the first table for each value of a join attribute may occur. As an example, some of the tuples in the first table may have the same attribute, in which case not all of tuples need to be accessed. At block 450, and corresponding to block 340 in FIG. 3, forming a filtering vector from the located positions of unique values of the join attribute may occur. For example, bitmap filtering may occur by taking only bits specified in a list of positions of tuples in the first table. At block 460, and corresponding to blocks 340 and 360 in FIG. 3, generating a bitmap index and data for each attribute in the second table from an attribute in the first table may occur. At block 470, corresponding to blocks 340 and 350 of FIG. 3, computing a target bitmap index for each unique value of an attribute in the second table may occur. At block 480, corresponding to block 360 of FIG. 3, generating target data for the attribute in the second table may occur. After the completion of generation of the target data by generating the target data from target bitmap indexes, the first table may complete its decomposition into the second table and the third table.

The data-level evolution operation of decomposition of a table as shown in FIGS. 3 and 4 may be expressed in pseudocode as shown in FIG. 5. FIG. 5 shows a list of pseudocode 510 for an exemplary embodiment of the invention showing an algorithm for decomposing a table with its supporting algorithms 520, 530. The algorithm for decomposing a table at 510 may call the algorithm for distinction of a value of a table column shown at 520. If the first two words of a filter vector in a bitmap are recorded in a separate file, the entire bitmap of the column may not be required to be accessed. Values of a row may be accessed by scanning an offset index of a column, and hashing may be used to recognized distinct values during the scan. The algorithm for decomposing a table 510 may further call the algorithm for filtering a bitmap 530 to select a list of positions.

In addition to decomposition of a table, mergence of a table is a further optional operation of data-level evolution as described in FIG. 2 with respect to the present invention. The following description in FIGS. 6-13 shows mergence of data with data-level evolution according to various optional embodiments of the invention.

Figure 6:
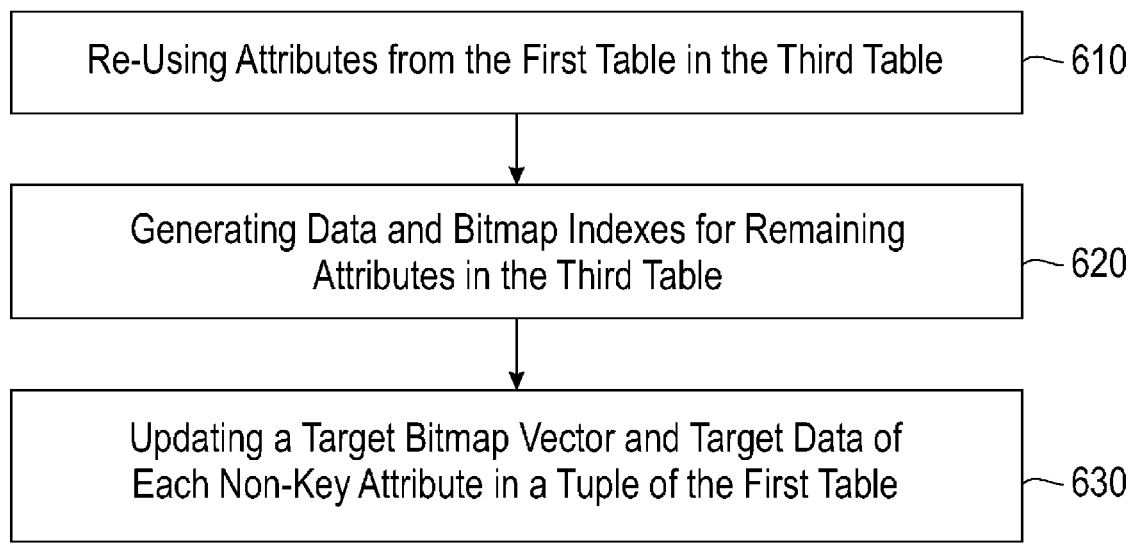
FIG. 6 is of an exemplary embodiment of the invention showing high-level steps for key-foreign key based mergence.

While FIGS. 3-5 show exemplary embodiments of decomposing a table, FIG. 6 shows data-level evolution as described in FIG. 2 and may include the operation 600 of key-foreign key based mergence. FIG. 6 is an exemplary embodiment of the invention showing high-level steps for key-foreign key based mergence. At block 610, a step of re-using attributes from the first table in the third table may occur. As an example, columns of the first table identical to the column in the third table may be reused in the third table. At block 620, generating data and bitmap indexes for attributes in the third table and updating attribute vectors may occur. At block 630, updating a target bitmap vector and target data of each non-key attribute in a tuple of the first table, according to the bitmap vector of the key attribute of the tuple in the first table may occur. The updating at 630 may occur for each tuple in the first table and for each non-key attribute in the tuple in the first table. As an example, if the first table contains a single attribute with multiple values, a vector corresponding to a list of values from the attribute may be returned. As a further example, if the first table contains multiple attributes, an AND operation on the bitmap vectors of the key attributes from the first table and the second table may be performed.

Figure 7:
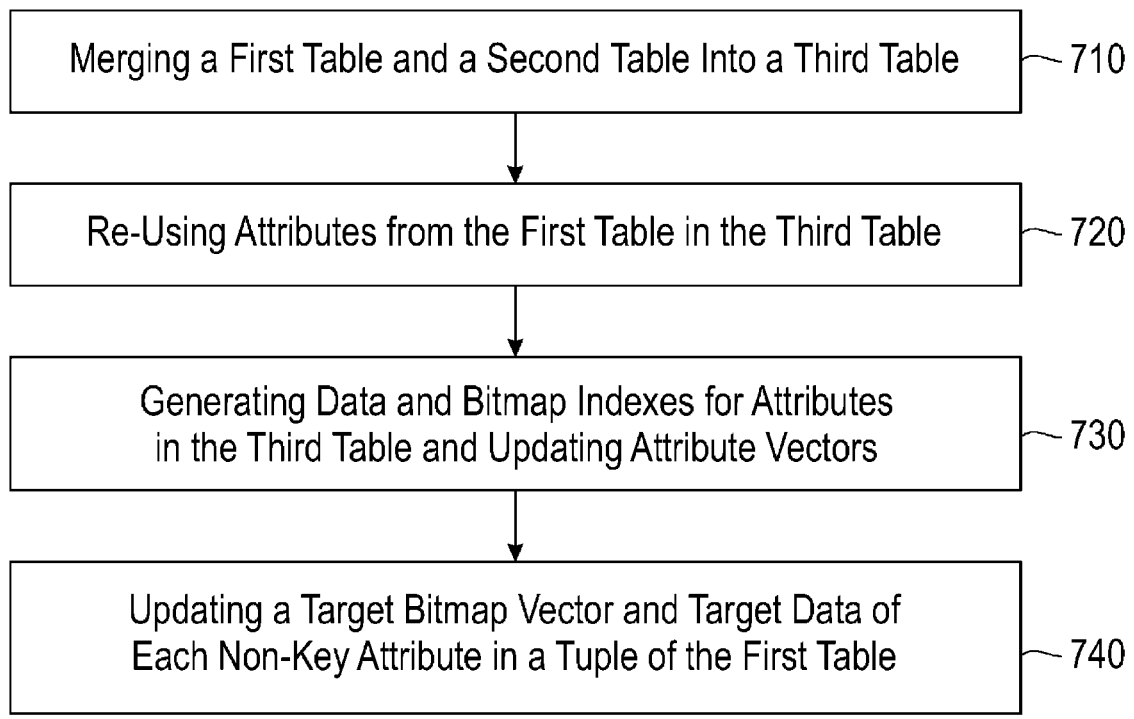
FIG. 7 is a flowchart of an exemplary embodiment of the invention showing key-foreign key based mergence of two tables.

While FIG. 6 shows a flowchart showing high-level steps for key-foreign key based mergence, FIG. 7 shows more detailed steps in a flowchart of an exemplary embodiment of the invention showing key-foreign key based mergence of two tables 700 with respect to the high-level steps for key-foreign key mergence shown in FIG. 6. At block 710, a step of merging a first table and a second table into a third table may occur. At block 720, corresponding to block 610 in FIG. 6, a step of re-using attributes from the first table in the third table may occur. For example, instead of generating all new columns in a resulting merged third table, columns of the first table may be reused in the third table. At block 730, corresponding to block 620 of FIG. 6, generating data and bitmap indexes for attributes in the third table and updating attribute vectors may occur. At block 740, corresponding to block 630 of FIG. 6, updating a target bitmap vector and target data of each non-key attribute in a tuple of the first table, according to the bitmap vector of the key attribute of the tuple in the first table may occur. As an example, to generate a bitmap vector in the merged third table of an attribute value, the attribute's vector in the first and second tables may be combined with an OR operation. In one exemplary embodiment of the invention, attribute values of the first table may be accessed sequentially. In a further exemplary embodiment of the invention, attribute values of the first table may be accessed randomly.

Key-foreign key based mergence as shown in FIGS. 6 and 7 may be embodied in the pseudocode shown in FIG. 8. FIG. 8 shows a list of pseudocode 800 for an exemplary embodiment of the invention showing an algorithm with respect to the key-foreign key based mergence. Line 3 (820) shows a scan of the first table, in which the procedure findvector 830 is called which returns the occurrences of an attribute in the first table. The function Mergence 810 passes the tables as parameters and returns a merged table.

Figure 9:
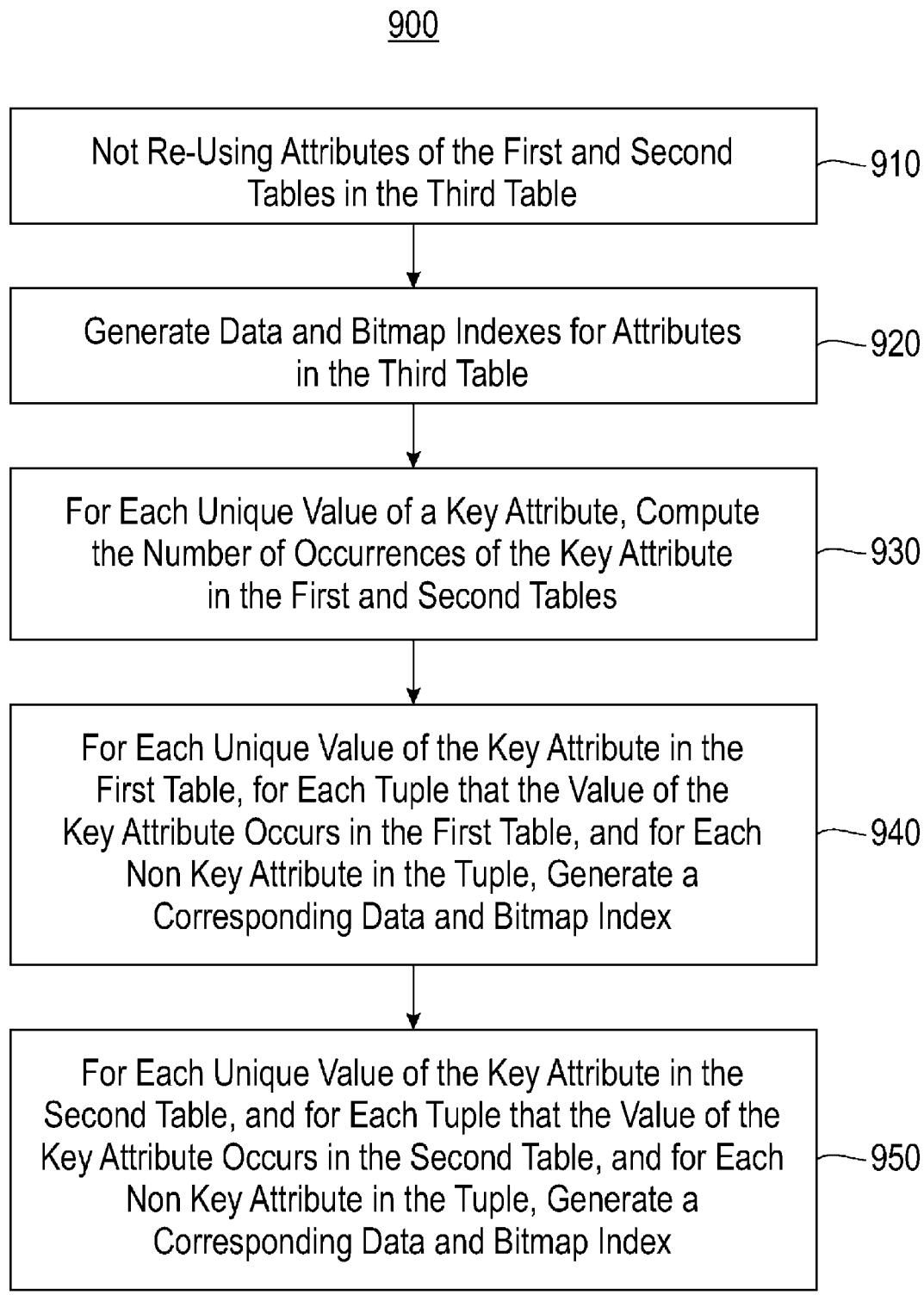
FIG. 9 is an exemplary embodiment of the invention showing high level steps for general mergence.

Data-level evolution as described in FIG. 2 may include the operation 900 of general mergence as shown in FIG. 9. Although with key-foreign key mergence as shown in FIGS. 6-8 columns in a table may be reused, in general mergence, both input tables may not be reused. FIG. 9 is an exemplary embodiment of the invention showing high level steps for the more detailed steps of general mergence shown in FIG. 10. While FIG. 7 showed a key-foreign key type of mergence, FIG. 9 shows a general type of mergence. At block 910, a step of not re-using attributes of the first and second tables in the third table may occur. At block 920, generating data and bitmap indexes for attributes in the third table may occur. At block 930, for each unique value of a key attribute, computing the number of occurrences of the key attribute in the first and second tables may occur. As an example, the number of occurrences of a unique value of an attribute in the first table and second table may be stored in a hash structure. At block 940, a step of generating a corresponding data and bitmap index for each unique value of a key attribute in the first table, for each tuple that the key attribute occurs in the first table, and for each non-key attribute of the tuple in the first table, may occur. At block 950, a step of generating a corresponding data and bitmap index for each unique value of a key attribute in the second table, for each tuple that the key attribute occurs in the second table, and for each non-key attribute of the tuple in the second table, may occur. As an example, a bitmap vector for an attribute value may be derived from the occurrence count of the attribute value.

Figure 10:
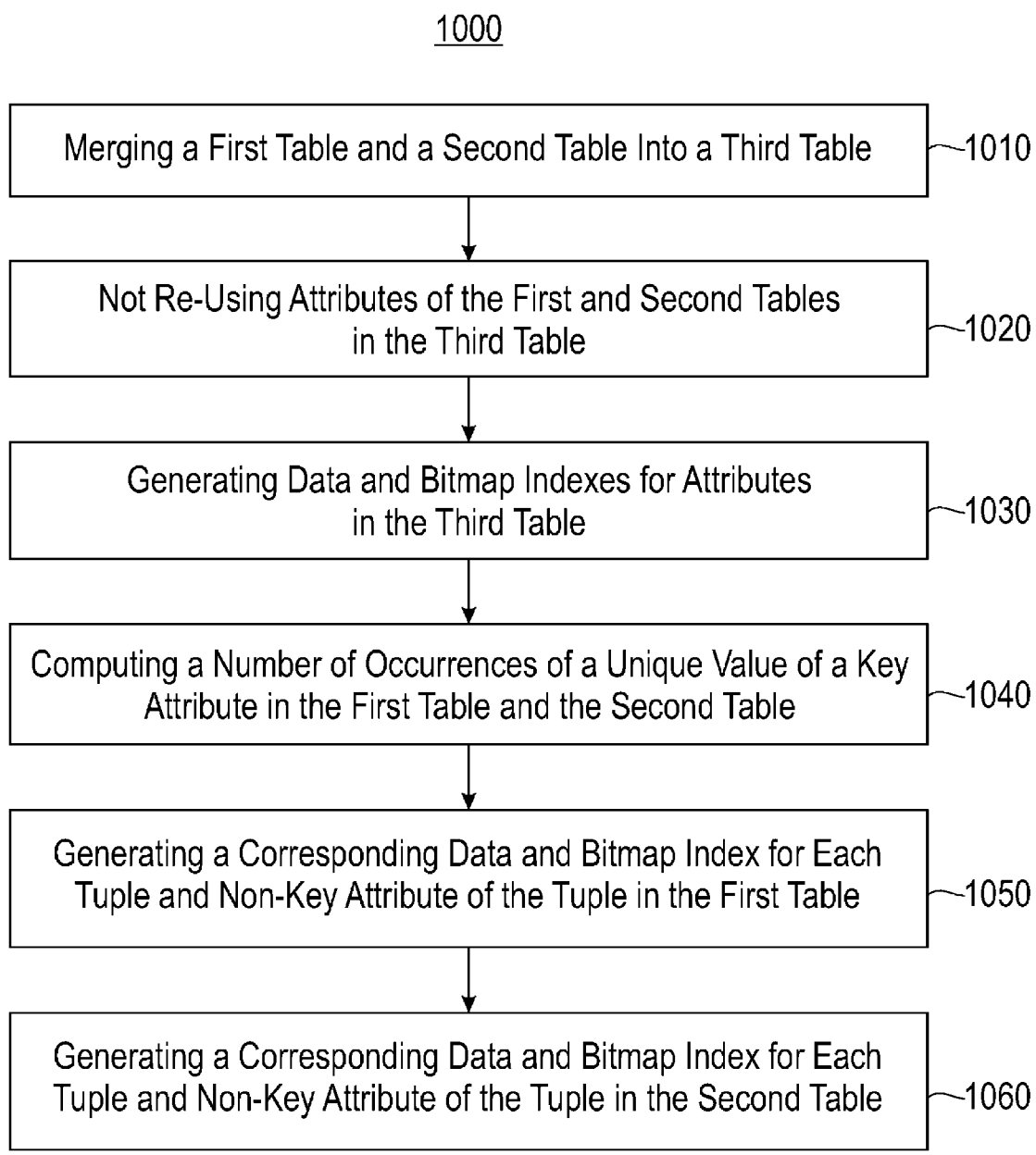
FIG. 10 is a flowchart of an exemplary embodiment of the invention showing general mergence of two tables.

While FIG. 9 shows high level steps of data-level evolution with general mergence, FIG. 10 shows more detailed steps of a flowchart of an exemplary embodiment of the invention showing general mergence of two tables 1000. At block 1010, a step of merging a first table and a second table into a third table may occur. At block 1020, corresponding to block 910 in FIG. 9, a step of not re-using attributes of the first and second tables in the third table may occur. For example, if both the first table and the second table may not be reused 1020, bitmaps for all the attributes in the first table and the second table may need to be generated 1050, 1060. At block 1030, corresponding to block 920 in FIG. 9, generating data and bitmap indexes for attributes in the third table may occur. At block 1040, corresponding to block 930 in FIG. 9, computing a number of occurrences of a unique value of a key attribute in the first table and the second table may occur. After computation of the number of occurrences of a unique value of an attribute in the first table and the second table, bitmaps for the attribute may be generated. For example, if the number of occurrences of a value of the attribute is three times in the first table, and five times in the second table, these occurrences may be multiplied to find the number of occurrences in the third table, equal to fifteen. At block 1050, corresponding to block 940 in FIG. 9, a step of generating a corresponding data and bitmap index for each tuple and non-key attribute of the tuple in the first table may occur. As an example, creation of bitmaps may occur in a two pass process, with the first pass counting the occurrences of an attribute value and the second pass creating the bitmaps. As an example, the first pass may access an attribute common to the first table and second table, and the second pass may scan the first table and second table in separate operations. At block 1060, corresponding to block 950 in FIG. 9, a step of generating a corresponding data and bitmap index for each tuple and non-key attribute of the tuple in the second table may occur.

The data-level evolution general mergence operation as shown in FIGS. 9 and 10 may be embodied in pseudocode as shown in FIG. 11. FIG. 11 shows a list of pseudocode 1100 for an exemplary embodiment of the invention showing an algorithm for general mergence. Lines 1-7 (1110) represent a first pass, and lines 8-9 (1120) represents a second pass in which processTable 1130 may be called twice to process two tables that are being merged. A total count of a number of inputs and outputs on disks for the two-pass process in a computer readable medium may be of the order of a table size of the first table and the second table, added to a bitmap size of the first table and the second table.

Figure 13:
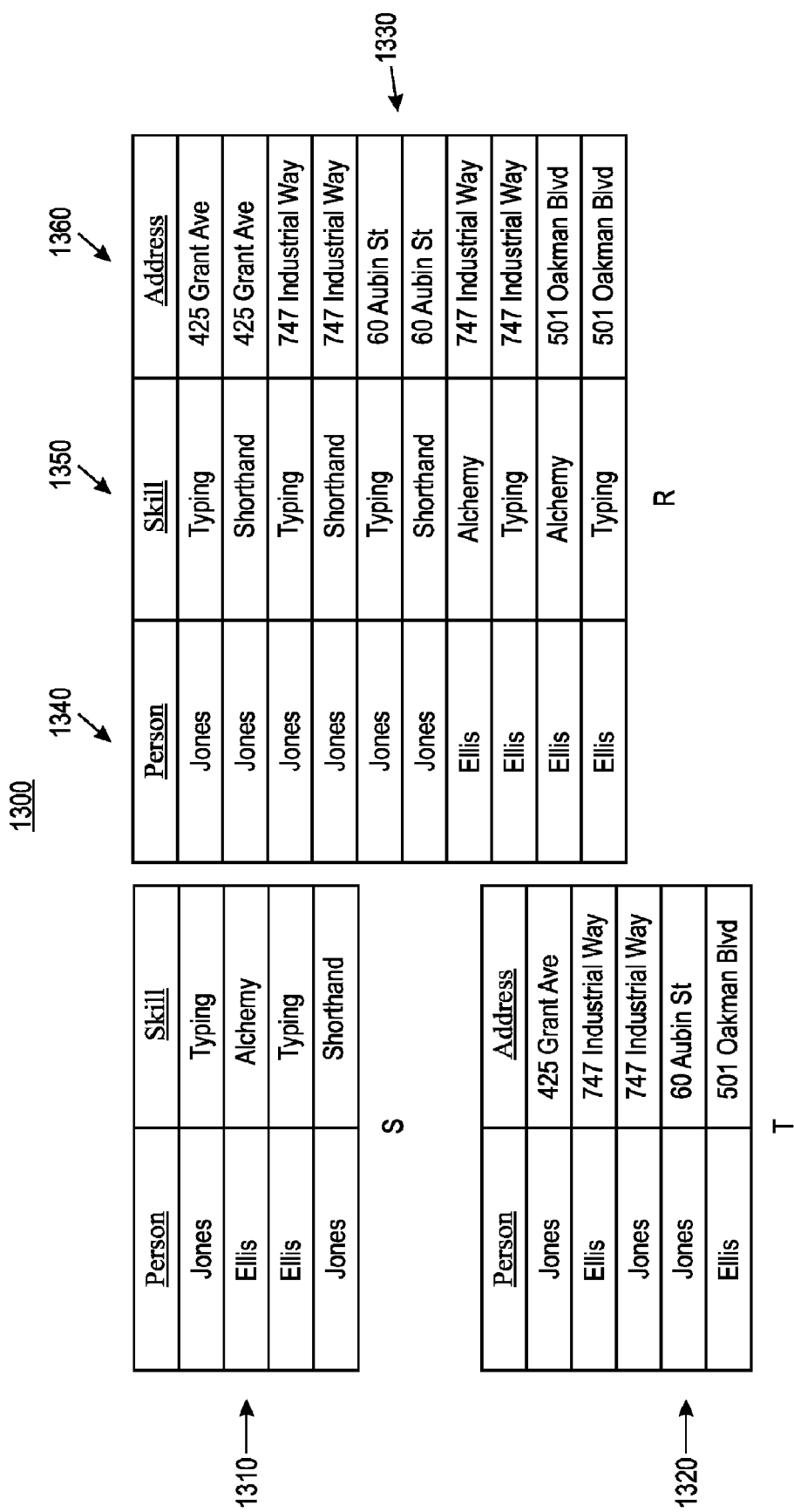
FIG. 13 is a block diagram of an exemplary embodiment of the invention showing non-reusable general mergence with re-organization.

For general mergence, FIGS. 9-11 show steps for merging two tables in a re-organized manner. FIGS. 12 and 13 show the general mergence of FIGS. 9-11 both prior to and after reorganization. FIG. 12 shows an exemplary embodiment of general mergence 1200 prior to reorganization. In non-reusable general mergence both input tables may not be reused in a resulting merged table, and attributes common to both input tables may not be the key of either of the input tables. Table S 1210 and table T 1220 may be merged into table R 1230. As shown at 1210, each person in table S 1210 may have multiple addresses. Table T 1220 shows that each person may have multiple skills. As the columns may therefore not be reused in resulting Table R 1230, all of a person's values may need to be considered to construct the resultant table R 1230. Therefore, the join attribute "Person" 1240 in table S 1210 and table T 1220 may be the key of neither table S 1210 nor table T 1220. In order to solve the problem of non-reusable tables, the merged table table R 1230 may be output after re-organizing the table R 1230. An example of merging tables using re-organization is shown in FIG. 13.

While FIG. 12 showed general mergence prior to re-organization, FIG. 13 is a block diagram of an exemplary embodiment of the invention showing non-reusable general mergence as described in FIGS. 9-11 after re-organization 1300. Clustering the tuples in table R 1330 by attributes may create a more organized merged table R 1330, in addition to creating a more efficient method for creating merged table R 1330. The tuples in table R 1330 may be first clustered by the join attribute person 1340. The tuples in table R 1320 may be next clustered by "Skill" 1350, a non-key attribute in table S 1310. The tuples in table R 1320 may be next clustered by "Address" 1360, a non-key attribute in table T 1320. This re-organized merged table R 1320 can be generated more quickly, as the positions of the attribute values can be derived in a less complex manner.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more performable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. Example embodiments may be performed with or without query processing.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should be understood, of course, that the foregoing relates to exemplary embodiments of the invention and that modifications may be made without departing from the spirit and scope of the invention as set forth in the following claims.

What is claimed is:

1. A computer-implemented method for decomposing a first table into a second table and a third table comprising:
   identifying reusable and non-reusable attributes of data stored in the first table;
   generating data and bitmap indexes for the second table;
   re-using attributes of the first table in the third table; and
   outputting the first table, the second table, and the third table, after decomposing the first table into the second table and the third table, in a visual form including at least one of displaying said tables on a display unit or printing said tables on a printer,
   wherein the generating of data and bitmap indexes for the second table includes:
   locating a first tuple position in the first table for each of a plurality of unique values of a join attribute;
   forming a filtering vector from a plurality of located positions of the unique values of the join attribute by taking bits specified in a list of positions of tuples in the first table;
   generating at least one of the data and bitmap indexes for the second table for a first attribute in the second table corresponding to a first attribute in the first table, and
   computing a target bitmap index for each unique value of the first attribute in the second table as a corresponding source bitmap index filtered by the filter vector; and
   generating target data for the first attribute in the second table.

2. The method of claim 1, wherein no entire bitmap of a column is accessed.

3. The method of claim 1, wherein the first two words of the filter vector are recorded in a file.

4. The method of claim 1, wherein the first table contains multiple key attributes, and bitmaps of the multiple key attributes are combined.

5. The method of claim 1, wherein an offset index of a column is scanned to access values for a row.

6. The method of claim 5, wherein hashing is used to recognize distinct values during the scan of the column.

7. A system comprising:
   a computer including a computer processor configured to process data evolution;
   a computer user interface configured to enter data for a first table and a second table;
   a data evolution engine; and
   a computer display configured to update the first, second, and third tables after decomposing the first table into the second table and the third table in a visual form including displaying said tables on a display unit,
   wherein the data evolution engine is configured to:
   merge the first table and the second table into a third table;
   reuse attributes from the first table in the third table;
   generate data and bitmap indexes for attributes in the third table not reused from the first table; and
   update a target bitmap vector, the step of updating the target bitmap vector including:
   updating the target bitmap vector and target data of each non-key attribute in a first tuple of a plurality of tuples of the first table, according to a bitmap vector of a key attribute in the first tuple of the first table;
   clustering the plurality of tuples in the first table according to each non-key attribute; and
   performing the updating of the target bitmap vector for the first tuple of the plurality of tuples in the first table and for at least one of the non-key attributes in the first tuple in the first table.

8. The system of claim 7, wherein the data evolution engine further accesses attribute values of the first table sequentially.

9. The system of claim 7, wherein the data evolution engine further accesses one of the key attributes of the first table randomly.

10. The system of claim 7, wherein the data evolution engine further returns a vector corresponding to a list of values from a first key attribute of the first table, wherein the first table contains a single attribute.

11. The system of claim 7, wherein the data evolution engine further performs an AND operation on the bitmap vectors of the key attribute from the first table and a key attribute from the second table, and wherein the first table contains multiple attributes.

12. The system of claim 7, wherein the data evolution engine further combines the key attribute in the first table with a key attribute in the second table with an OR operation.

13. A computer program product for data evolution, the computer program product comprising:
 a non-transitory computer readable storage medium having computer readable program code embodied therewith, the computer readable program code including:
 computer program code configured to identify reusable and non-reusable attributes of data stored in the first table;
 computer program code configured to merge a first table and a second table into a third table, wherein attributes of the first table and attributes of the second table are not reused in the third table;
 computer program code configured to generate data and bitmap indexes for attributes in the third table, and
 computer program code configured to output the first, second, and third tables after decomposing the first table into the second table and the third table in a visual form including on a display unit,
 wherein the computer program code configured to generate data and bitmap indexes for attributes in the third table includes:
 computer program code configured to compute a number of occurrences of a first unique value of a key attribute in the first table and a first unique value of a key attribute in the second table;
 computer program code configured to generate a corresponding data and bitmap index for each tuple in the first table and for each non-key attribute of a first tuple in the first table, in which the first unique value of the key attribute in the first table occurs in the first table, for each of a plurality of unique values of the key attribute of the first table such that a bitmap vector for the first unique value of the key attribute in the first table is derived from the computed number of occurrences of the first unique value of the key attribute in the first table; and
 computer program code configured to generate a corresponding data and bitmap index for each tuple in the second table and for each non-key attribute of a first tuple in the second table, in which the first unique value of the key attribute occurs in the second table, for each of a plurality of unique values of the key attribute of the second table.

14. The computer program product of claim 13, wherein a number of occurrences of the first unique value of the key attribute of the first table and first unique value of the key attribute of the second table is stored in a hash structure.

15. The computer program product of claim 13, wherein the computer program code computing a number of occurrences of the first unique value of a key attribute in the first table and the first unique value of a key attribute in the second table scans the first table and the second table in a first pass and a second pass.

16. The computer program product of claim 15, wherein the first pass only accesses a second attribute common to the first table and the second table.

17. The computer program product of claim 15, wherein the second pass scans the first table and the second table in separate operations.

18. The computer program product of claim 13, wherein a total count of a number of inputs and outputs on disks in a computer readable medium is of the order of a table size of the first table and the second table, added to a bitmap size of the first table and the second table.

19. A computer-implemented method for use with a column-oriented database, comprising:
 performing a decompose table operation on the first data and the first index of the first schema, wherein a first table is decomposed into a second table and a third table:
 identifying re-usable and non-reusable attributes of data stored in the first table; transforming first data from a first schema into a second schema, wherein portions of both the first data and a first index of the first schema are identified that can be re-used in the second schema, and portions of both the first data and the first index of the first schema not included in the re-usable portions of the first data and the first index of the first schema are transformed directly into the second schema;
 performing a merge table operation on the first data and the first index of the first schema, wherein a first table and a second table are merged into a third table; and
 re-organizing the third table after the merge table operation such that the attributes of a first column in the third table are clustered.

20. The method of claim 19, wherein said transforming first data does not involve query processing.

* * * * *